March 24, 1959     A. J. MELLEN     2,878,566
ARC-MEASURING INSTRUMENT
Filed June 21, 1957
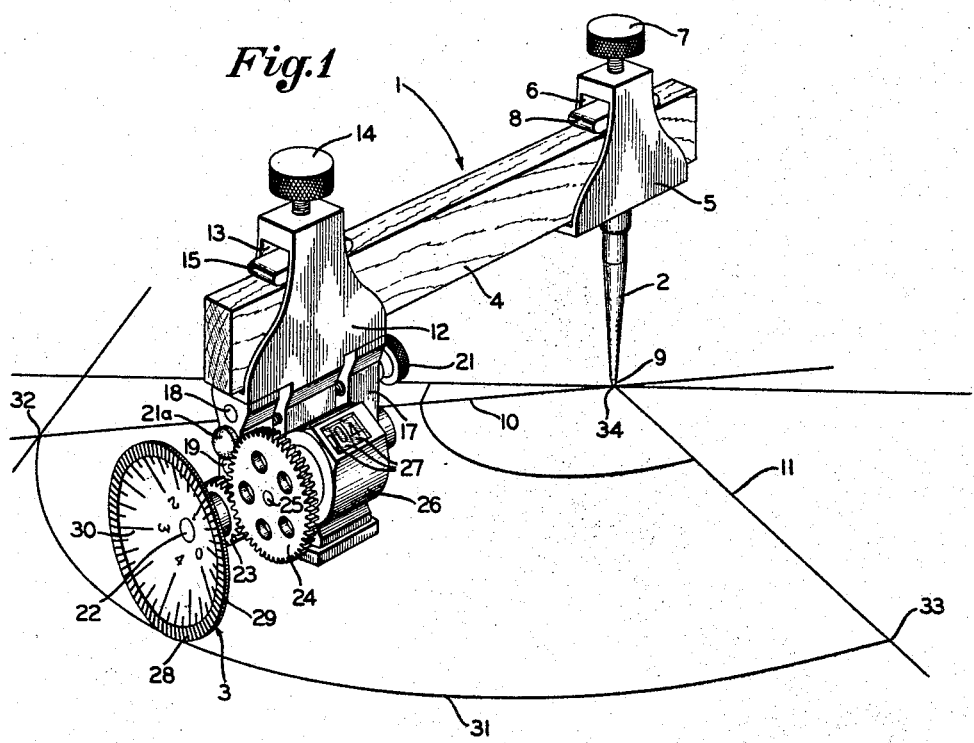
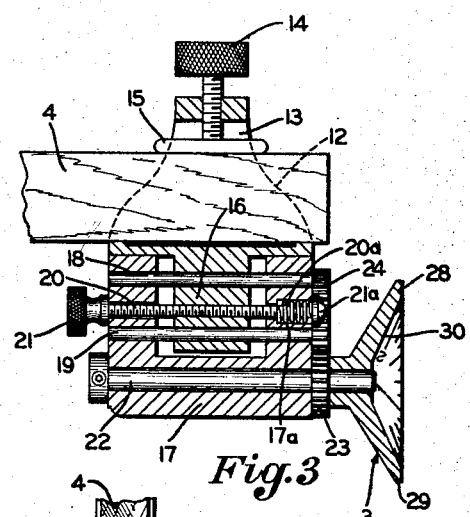
Fig.3
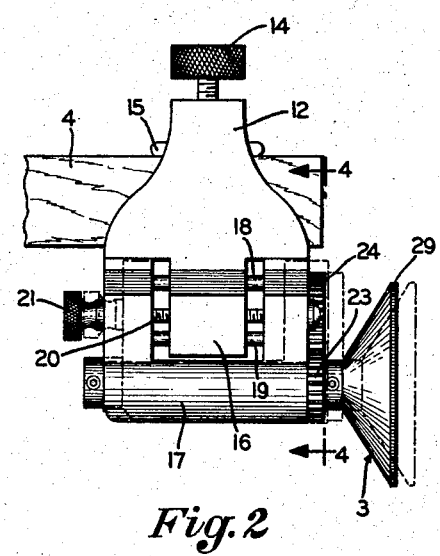
Fig.2
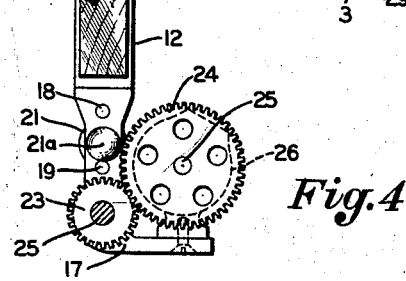
Fig.4
INVENTOR.
Arthur J. Mellen
BY
Frease & Bishop
ATTORNEYS

United States Patent Office 2,878,566
Patented Mar. 24, 1959

2,878,566

ARC-MEASURING INSTRUMENT

Arthur J. Mellen, Canton, Ohio

Application June 21, 1957, Serial No. 667,157

1 Claim. (Cl. 33—1)

This invention relates to measuring instruments and more particularly it pertains to an instrument for measuring the length of arcs, circles, and the like.

This invention contemplates an improvement in devices for accurately measuring the length of circles and arcs that depend upon a center. Prior devices have been known for measuring arcs and circles but have been subject to various disadvantages, particularly for craftsmen such as sheet metal workers who require rigid measuring instruments adapted for accuracy.

Usually such prior devices have measured either angles subscribed by an arc or the radius of an arc without indicating the length of the arc per se. Other prior devices while measuring the length of an arc have been restricted to measuring arcs within certain limits of lengths of radius. Still other prior devices have not provided a rigid connection between the spaced portions of the instrument, namely the centering pin and the outer periphery or arc-traversing portion, resulting in inaccuracies of measurement.

Moreover, still other prior devices have been lacking in the provision of means for indicating desired fractional measurements.

Finally, some prior devices have not included the use of a fine setting means whereby the skilled sheet metal worker or the like may set his instrument to obtain a more accurate reading.

Accordingly, it is an object of this invention to provide an arc-measuring instrument adapted for accurate measurements of an arc or circle.

It is another object of this invention to provide an arc-measuring instrument which clearly indicates fractional measurements in a manner readily visible to the observer.

It is another object of this invention to provide an arc-measuring instrument which may be used for arcs having very short or very long radii.

It is a further object of this invention to provide an arc-measuring instrument which is rigid in construction and therefore more accurate in measurement than prior devices.

Finally, it is an object of this invention to provide an improved instrument for measuring arcs, circles, and the like which accomplishes the foregoing desiderata in an inexpensive manner with simplified adjustment, maintenance, and operation.

These and other objects and advantages apparent to those skilled in the art from the following description and claim may be obtained, the stated results achieved, and the described difficulties overcome by the discoveries, principles, apparatus, parts, combinations, subcombinations, and elements which comprise the present invention, the nature of which is set forth in the following statement, a preferred embodiment of which—illustrative of the best mode in which applicant has contemplated applying the principles—is set forth in the following description, and which is particularly and distinctly pointed out and set forth in the appended claim forming part hereof.

The nature of the improved instrument for measuring arcs of the present invention may be stated in general terms as including a centering pin, an arc-measuring wheel rotatably mounted on a clamp portion, and an interconnecting bar extending between the centering pin and the clamp portion; the centering pin being mounted on a second clamp engaging the bar, the arc-measuring wheel being operatively connected to a counter for a unit of measure, the circumferential portion of the wheel having a scale divided into fractional portions of a unit of measure, and the arc-measuring wheel being rotatably mounted on the first clamp and movable by fine adjustments longitudinally of the axis of the bar.

By way of example, a preferred embodiment of the apparatus of the present invention is shown in the accompanying drawings, wherein:

Figure 1 is a perspective view of the arc-measuring instrument showing its setup for measuring an arc laid out on a flat surface;

Fig. 2 is an elevational view of a portion of the instrument showing the side not evident in Fig. 1 and showing an alternate position for fine setting;

Fig. 3 is a vertical sectional view showing the manner in which the measuring wheel is mounted and showing the fine setting device; and Fig. 4 is a sectional view taken on the line 4—4 of Fig. 2.

Similar numerals refer to similar parts throughout the various figures of the drawings.

In Fig. 1 an arc-measuring instrument is generally indicated at 1. It includes a centering pin 2, an arc-measuring wheel 3, and an interconnecting member or rod 4.

The centering pin 2 is attached to the under surface of a clamp 5 having an opening 6, a clamping screw 7, and a clamping member 8. The clamping member 8 is rotatably attached to the lower end of the screw 7 and is movable vertically within the opening 6 for engagement with the rod 4. The lower end of the centering pin 2 is tapered at 9 for point contact with intersecting lines 10 and 11.

The interconnecting member or rod 4 is a rigid member. For convenience a short rod may be used for arcs having short dimensions and a longer rod may be used for arcs of relatively long dimension. The rod 4 is designed to retain the desired distance between the pin 2 and the wheel 3. The rod 4 is of sufficient width and thickness to avoid twisting or bending.

As shown in Fig. 3, the wheel 3 is rotatably mounted at the lower end of a clamp 12 having an opening 13, a clamping screw 14, and a clamping member 15, all of which parts are similar to those of the clamp 5 as set forth above.

The lower portion of the clamp 15 includes a fixed member 16 to which is attached a U-shaped member 17 having a pair of vertically spaced slide elements 18 and 19 extending between the legs of the U-shaped member. The slide elements 18 and 19 are slidably mounted in the fixed member 16 so that by rotation of a fine adjustment screw 20 having a knurled knob 21 at one end thereof, the U-shaped member 17 is movable longitudinally of the bar 4.

To prevent the development of play between the various parts mounting the members 16 and 17 due to surface wear between the interfaces of the knob 21 and the member 17, a counterbored hole 17a is provided in the member 17 and a coil spring 20a is provided to create tension between the end of the counterbored hole and a cap 21a on the end of the screw 20. In addition, the spring 20a holds the members 16 and 17 in precise adjustment notwithstanding any looseness that may develop between the screw and said members over a period of time.

As shown in Fig. 3, the wheel 3 is fixedly mounted on a shaft 22 which is rotatably mounted in the U-shaped member 17. A pinion gear 23 is also mounted on the shaft 22 and engages a gear wheel 24 (Fig. 4) which is mounted on a shaft 25 of a counter 26. The counter 26 includes at least three counter wheels 27 indicating units, tens and hundreds of a unit of measure. The wheels are operatively connected to the shaft 25 in the usual manner.

The measuring wheel 3 is conically shaped with the smaller end fixedly mounted on the shaft 22 and with the larger end or periphery 28 that is milled or notched at 29 for frictionally rolling over a plane. The inner surface 30 of the wheel 3 includes a circular scale having radially extending scale lines, the outer ends of which lie in the periphery 28 of the wheel. The scale on the wheel 3 measures fractional parts of a unit of measure. Though any unit of linear measure may be used, the preferred unit is the inch. Accordingly, the scale on the inner surface 30 of the wheel 3 measures five inches around the periphery 28 from the "0" to "0," and fractional portions of an inch are disposed between each whole inch marking on the scale. By providing the scale on the inclined surface 30, the scale is more readily visible to the operator.

When a curved line is measured, the "0" marking on the scale is placed on one end of the arc and the wheel rotated clockwise throughout the length of the arc. When the one inch, two inch, etc. mark on the scale rolls over the line, the corresponding number for one inch, two inch, etc. is recorded on the unit counter wheel 27. Although the periphery of the wheel 3 is exactly five inches around, it may be of any other dimension so long as the scale on the inner surface 30 of the wheel is altered accordingly.

In operation it may be desirable for a sheet metal worker to measure the length of an arc 31 (Fig. 1) between the ends 32 and 33. For this purpose the wheel 3 is first rotated until the counter 26 indicates zero, i.e., "000." With such a reading the "0" on the scale of the wheel 3 is at the lowermost point of the wheel and ready for contact with the end 32 of the line 31. At the same time the tapered point 9 of the centering pin 2 is placed at center point 34 and the entire assembly is rotated about the pin 2 towards the other end 33 of the arc 31 so that the wheel 3 rolls in a clockwise direction.

When the wheel reaches the end 33 of the arc 31 the length of the arc in whole numbers is indicated by the total number of whole inches shown by the counter wheels 27. Any fractional portion of an inch over the whole number indicated on the counter is indicated by the scale marking in contact with the end 33 of the arc 31. Accordingly, an accurate measurement of the length of the arc 31 may be obtained.

Further, any fractional portion of the arc 31 may be established by measuring the desired portion and marked as indicated at the contact point of the wheel 3 and the arc 31. For example, if the arc 31 is twenty inches long between ends 32 and 33, an eleven inch arc from either end may be measured and indicated (marked) for convenience.

The foregoing obtains whether the rod 4 is short or long, such as where a very large piece of sheet metal is being laid out for accurate measurement. The rigidity of the integral parts of the device contributes to an entire structure which is capable of rendering accurate measurements for any length of arc contemplated for measurement. In addition, finer adjustment for locating the periphery 28 of the wheel 3 precisely on the line of the arc 31 is possible by the use of fine adjustment screw 20.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction shown.

Having now described the features, constructions and principles of the invention, the characteristics of the new arc-measuring instrument, and the advantageous, new and useful results provided; the new and useful discoveries, principles, parts, elements, combinations, subcombinations, structures and arrangements, and mechanical equivalents obvious to those skilled in the art are set forth in the appended claim.

I claim:

An arc-measuring instrument including a centering pin, an arc-measuring wheel, and a rigid interconnecting member; a first clamp adapted for detachable engagement with the interconnecting member and mounting said centering pin, a second clamp detachably mounted on the interconnecting member and spaced from the first clamp, the second clamp including an integral body portion, a U-shaped frame attached to the body portion, a fine adjustment screw for movement of the U-shaped frame in a direction parallel to the axis of the interconnecting member, the arc-measuring wheel being rotatably mounted on the U-shaped frame, a counter of units of linear measure mounted on the U-shaped frame and operatively connected to the wheel, the wheel having a conical shape and including inner and outer surfaces inclined inwardly from its periphery toward the axis of rotation thereof, a unit of measure scale around the periphery of the wheel and on said inner surface, the scale including at least one whole number of unit of measure, and each unit of measure on the scale having fractional increments thereof.

References Cited in the file of this patent

UNITED STATES PATENTS

| | | |
|---|---|---|
| 37,002 | Lawrence | Nov. 25, 1862 |
| 415,466 | Oliver | Nov. 19, 1889 |
| 476,380 | Haslam | June 7, 1892 |
| 638,098 | Cleveland | Nov. 28, 1899 |
| 1,600,470 | Hollopeter | Sept. 21, 1926 |
| 1,629,143 | Bungart | May 17, 1927 |
| 2,325,130 | Harmon | July 27, 1943 |

FOREIGN PATENTS

| | | |
|---|---|---|
| 523,029 | France | Apr. 13, 1921 |